(12) United States Patent
Hosic et al.

(10) Patent No.: US 11,074,062 B1
(45) Date of Patent: Jul. 27, 2021

(54) NEURAL NETWORKS FOR SOFTWARE PATCH APPLICABILITY

(71) Applicant: Amazon Technologies, Inc., Seattle, WA (US)

(72) Inventors: Jasenko Hosic, Seattle, WA (US); Evan Gregory Tobac, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 69 days.

(21) Appl. No.: 16/540,908

(22) Filed: Aug. 14, 2019

(51) Int. Cl.
*G06F 8/65* (2018.01)
*G06N 3/08* (2006.01)
*G06F 8/71* (2018.01)

(52) U.S. Cl.
CPC ............... *G06F 8/65* (2013.01); *G06N 3/08* (2013.01); *G06F 8/71* (2013.01)

(58) Field of Classification Search
CPC ............... G06F 8/60–71; G06F 8/751; G06N 3/02–126
USPC .................................................. 717/168–178
See application file for complete search history.

(56) References Cited

U.S. PATENT DOCUMENTS

| 6,427,227 | B1* | 7/2002 | Chamberlain | G06F 8/60 717/124 |
| 7,823,127 | B2* | 10/2010 | Zeidman | G06Q 10/10 717/123 |
| 9,459,861 | B1* | 10/2016 | Rogers | G06F 8/751 |
| 9,606,793 | B1* | 3/2017 | Magnezi | G06F 11/368 |
| 10,095,734 | B2* | 10/2018 | Fontenot | G06F 16/332 |
| 10,162,612 | B2* | 12/2018 | Apte | G06F 8/76 |
| 10,789,057 | B2* | 9/2020 | Vichare | G06F 8/60 |
| 10,860,312 | B1* | 12/2020 | Elwell | G06F 8/71 |
| 2009/0089754 | A1* | 4/2009 | Zeidman | G06F 21/105 717/123 |
| 2012/0124581 | A1* | 5/2012 | Nitta | G06F 8/65 718/1 |

(Continued)

OTHER PUBLICATIONS

Liu, B., et al., αDiff: Cross-Version Binary Code Similarity Detection with DNN, ASE 2018: Proceedings of the 33rd ACM/IEEE International Conference on Automated Software Engineering, Sep. 2018, pp. 667-678, [retrieved on Mar. 19, 21], Retrieved from the Internet: <URL:http://dl.acm.org/>.*

(Continued)

*Primary Examiner* — Geoffrey R St Leger
(74) *Attorney, Agent, or Firm* — Eversheds Sutherland (US) LLP

(57) ABSTRACT

Systems, devices, and methods are provided for using neural networks to determine the applicability of a software patch to a software code. A system may receive a first code modification associated with first software code, and determine a second code modification associated with second software code, the second software code including the second code modification. The system may determine a first feature vector associated with the second code modification, and may determine a threshold value associated with the first feature vector. The system may determine a second feature vector associated with the first code modification, and may determine that the second feature vector satisfies the threshold value. The system may send an indication to initiate the first code modification to the software code.

20 Claims, 8 Drawing Sheets

(56) References Cited

U.S. PATENT DOCUMENTS

| | | | | |
|---|---|---|---|---|
| 2016/0283229 | A1* | 9/2016 | Rogers | G06F 8/751 |
| 2016/0364473 | A1* | 12/2016 | Fontenot | G06F 16/245 |
| 2017/0193437 | A1* | 7/2017 | Apte | G06F 8/51 |
| 2017/0269905 | A1* | 9/2017 | Wu | G06F 8/10 |
| 2018/0307480 | A1* | 10/2018 | Doyle | G06F 8/658 |
| 2019/0196952 | A1* | 6/2019 | Manchiraju | G06N 3/088 |
| 2020/0019393 | A1* | 1/2020 | Vichare | G06F 8/60 |
| 2020/0104102 | A1* | 4/2020 | Brockschmidt | G06F 8/34 |
| 2020/0134457 | A1* | 4/2020 | Montrone | G06F 8/65 |

OTHER PUBLICATIONS

Feng., Q., et al., Learning Binary Representation for Automatic Patch Detection, 16th IEEE Annual Consumer Communications & Networking Conference (CCNC), Jan. 11-14, 2019, 6 pages, [retrieved on Mar. 19, 21], Retrieved from the Internet: <URL:http://ieeexplore.ieee.org/>.*

* cited by examiner

NEURAL NETWORKS FOR SOFTWARE PATCH APPLICABILITY

BACKGROUND

Software is increasingly being used for a variety of applications. To address vulnerabilities or bugs in software, patches may be developed and applied to computer programs. Multiple patches may be developed to address software vulnerabilities and bugs. When software is copied and diverges from the original, it may be difficult to determine whether a particular software patch for the original software will address the vulnerability or bug in the new software.

Figure 1:
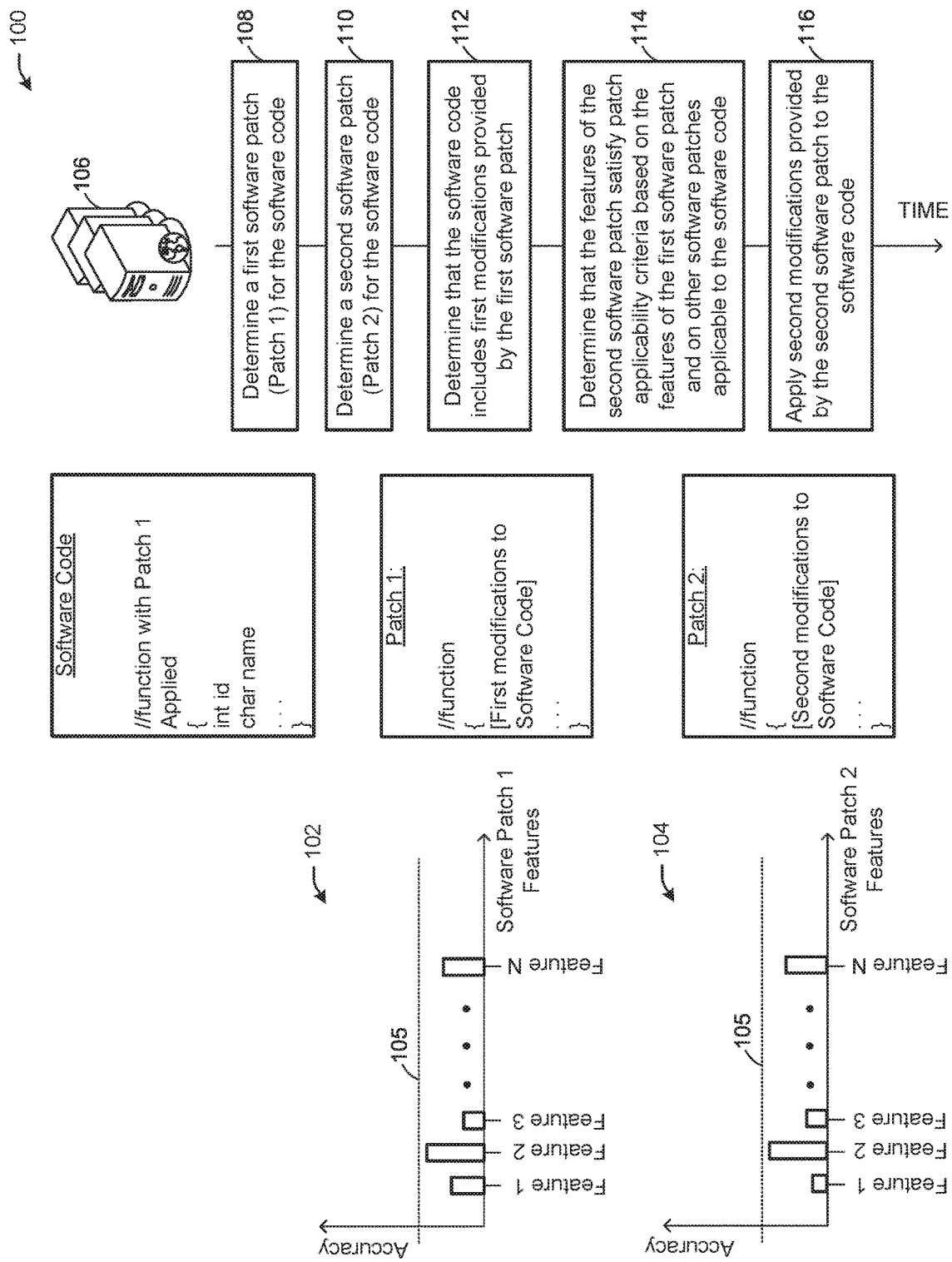
FIG. 1 illustrates an example system for using neural networks to determine software patch applicability, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for using neural networks to determine the applicability of software patches.

Software libraries may include various software patches for different applications. Software patches may include modifications to software code (e.g., deleted or added code). For example, software bugs in a kernel, software using a kernel, and others may have libraries of patches to address vulnerabilities that have been identified in a codebase. Software users may recognize and report software vulnerabilities, and software developers may generate patches to address the reported vulnerabilities. Many software patch projects and libraries may be open-sourced.

Software developers may modify existing software (e.g., add code to or remove code from software), and move code from one file to another file. Due to the changes to software and/or the location of the code, it may be difficult to determine whether a patch for the original codebase that it was designed to address still applies to a modified codebase (e.g., a collection of source code). For example, if a modified codebase deviates too significantly (e.g., too many added or deleted lines of code), then the patch may no longer apply to fix the bug or vulnerability of a codebase. In a large collection of patches, selecting applicable patches may be a challenge. Not only would analyzing thousands of patches be time consuming, but applicability assessments may be difficult using manual review.

For example, when software is built on a first version of a kernel, software patches are developed to address vulnerabilities in the first version of the kernel, and patches may address the vulnerabilities in the first version of the kernel. When a second version of the kernel is released, it may be difficult to determine whether the software patches apply to the second version of the kernel, as one may need to determine whether the same vulnerabilities exist in the second version of the kernel as existed in the first version of the kernel.

A manual investigation of modified patch applicability may include analyzing a text file or other document with the patch (e.g., lines of software code). The patch may indicate new lines of code that the patch adds, and lines of code that the patch removes. In this manner, applying (e.g., making changes to the codebase as described in the patch) may result in adding some lines of code and removing other lines of code from the software to which the patch applies. To manually determine whether the modified patch will apply cleanly (e.g., with no changes or a threshold number of changes to the patch) to any given software, one may have to analyze lines of code to determine if the patch (e.g., the added and removed code) would be implemented and allow the patched version of the given software to execute.

Therefore, the determining of applicability of software patches to vulnerabilities and bugs may be improved.

In one or more embodiments, neural networks and other machine learning techniques may be implemented to assess whether software patches apply to a particular software application, library, kernel, bug, or vulnerability. Machine learning models may learn from previous decisions regarding the applicability of patches. Machine learning models may be set up and trained once, and the models may be adjusted based on results of patch applicability determinations. For example, bug tracking tools such as JIRAs and Gerrits may provide records of the patches, their code changes, the results of pushing the code changes of the patches, and other data related to results of applying a patch. Such gathering of data from patch records may refer to a data gathering phase.

In one or more embodiments, neural networks and other machine learning techniques may execute a feature extraction phase. The neural networks and other machine learning techniques may quantify codebases, text files with code patches, and other documents and files by determining features such as how similar the text of modified codebase (e.g., modified by a patch) is to an original codebase (e.g., determining how many new lines of code were added or removed, determining how many new variables were introduced to or removed from the codebase, Levenshtein-Damereau distance (e.g., a number of character changes to perform on one piece of text for that text to match another piece of text) between the patch and the codebase, the Needleman-Wunch alignment, etc.). Based on the features, a patch may be compared to previously evaluated patches to determine whether a patch is applicable or not applicable. For example, the number of lines of code added to a codebase by a software patch being evaluated may be compared to the number of lines of code added to the codebase by a software patch already identified as applicable to the codebase.

In one or more embodiments, extracted features of code may be represented by a feature vector with a respective value for each feature. For example, a feature vector may contain values for a number of lines of code added by a patch, a number of lines of code removed by a patch, a number variables added by a patch, and a number of variables removed by a patch. If the respective numbers of those variables are: 1, 2, 3, 4, then the feature vector may be represented by [1 2 3 4]. The neural networks and other machine learning techniques may determine whether a feature vector matches or is more similar to a set of values in feature vectors of known applicable patches or to feature vectors of known non-applicable patches. For example, the neural networks and other machine learning techniques may set thresholds, feature weights (e.g., indicative of how determinative a feature may be for a determination of a software patch's applicability to a codebase), and other criteria used to determine software patch applicability based on analysis of software patches that the neural networks and other machine learning techniques have examined for applicability to a given codebase. The neural networks and other machine learning techniques dynamically may adjust criteria while analyzing features of a software patch. For example, when a Levenshtein-Damereau distance of a software patch is less than a threshold distance, a threshold value for other features may be increased (e.g., loosening the tolerance of other features), or when the Levenshtein-Damereau distance exceeds a threshold distance, a threshold value for other features may be decreased (e.g., tightening the tolerance of other features).

In one or more embodiments, to determine whether a feature vector matches criteria for an applicable patch or for a non-applicable patch, the neural networks and other machine learning techniques may use vector space distance determinations between respective feature vectors. For example, a 20-dimensional feature vector of a patch may be compared to 20-dimensional feature vectors of known applicable and non-applicable patches based on previous assessments of patch applicability. When a feature vector has the same values as another patch identified as applicable to a codebase, then the feature vector may be representative of an applicable patch. When characteristics of applicable patches indicate that certain feature values are above or below threshold values, or within threshold ranges, then the same threshold values and ranges may be applied to evaluate other patches. When a patch's feature vector values meet the criteria of other applicable patches, the neural network or other machine learning models may determine that a patch is applicable. When a patch's feature vector meets criteria associated with non-applicable patches or fails to meet criteria of applicable patches, the neural networks and other machine learning models may identify the patch as non-applicable to a codebase. For example, applicable patches may have a smaller Levenshtein-Damereau distance (e.g., below a threshold distance) than patches that do not apply to a codebase, or may have a number of added lines below a threshold while patches that do not apply have a number of added lines exceeding the threshold.

In one or more embodiments, to determine whether a patch is applicable or not, the neural networks and other machine learning techniques may use threshold confidence levels/scores. For example, a feature vector for a patch may be assigned a percentage applicable output based on the distance of the feature vector from a feature vector of an applicable or non-applicable patch. The closer to a feature vector of an applicable patch, the higher the percentage applicability a feature vector may be. The confidence score thresholds may be adjusted based on machine learning analysis of software patches.

In one or more embodiments, the neural networks and other machine learning techniques may update their evaluation criteria based on whether previously evaluated patches were applicable or not applicable (e.g., whether software code modifications of previously evaluated patches were made to a codebase) given their features, for example. When a patch was applicable, the machine learning models may update to reflect that the numerical values of features of the applicable patch were applicable, allowing for an analysis of whether another patch's features match the numerical features of other applicable patches. For example, feature values may be weighted, and thresholds may apply to respective feature values. Feature values that are more likely to affect whether a patch is applicable may be weighted higher than feature values whose variation does not affect patch applicability. The neural networks and other machine learning techniques may adjust thresholds and weights for respective features based on analysis of patches and whether patches having feature values of certain ranges renders the patch more or less likely to be applicable to a codebase.

In one or more embodiments, the way that a file to be patched may be improved. For example, whenever a patch for a file is received, the name for the file may have changed or the location where the file is stored may have moved. Identifying relevant sections of code to which to apply the patch therefore may be difficult, resulting in improper determinations that the file for a patch no longer exists or that the code to which the patch applies no longer exists. For example, code may have a vulnerability, and developers may delete the file with the code, but copy the code to another file. A patch may apply to the deleted file, but an enhanced file identification method may identify where the contents may have been moved (e.g., another file) even when that file or other location is not provided.

In one or more embodiments, a patch may have been applied previously to a codebase. Therefore, developers may have a patched version of code or an unpatched version of the code (e.g., when the patch has not yet been applied to the code). With an unpatched version of code, the added lines of a patch may be removed (e.g., not present), and the Levenshtein-Damereau distance may provide a number of character changes that would have to be made to the unpatched version to match another version of the code (e.g., a modified version of the code). When a patched version of the code is used, added and deleted lines of the code may apply (e.g., the deleted lines may be left out, and the added lines may be left in), and the Levenshtein-Damereau distance may provide a number of character changes that would have to be made to the unpatched version of the code to result in the patched version of the code (e.g., a the number of characters in the code that would change when a software patch is applied). When the Levenshtein-Damereau distance for the patched version of code is shorter than the Levenshtein-Damereau distance for the unpatched version of code, such may indicate that the patch already has been applied to the code. When the Levenshtein-Damereau distance for the unpatched version of code is shorter than the Levenshtein-Damereau distance for the patched version of code, such may indicate that the patch has not yet been applied to the code. Values for Levenshtein-Damereau distance may be weighted (e.g., an added line or character may be weighted differently than a removed character or line).

In one or more embodiments, vector features for software patches may include the Levenshtein-Damereau distance, the Needleman Wunsch alignment, a number of unused variables, a number of added lines or characters, a number of removed lines or characters, a number of changes made by a patch, common N-Grams (e.g., a sequence of N characters, where "New York" is an 8-gram) used in a patch, and other variables.

In one or more embodiments, "diff code" may be used to compare versions of code and identify the differences between the versions. For example, diff code may indicate when a patched or unpatched version of code uses variables that do not apply to a modified version of the code. Diff code may compare versions of code and provide the differences used to quantify the feature vector values.

In one or more embodiments, devices may execute software whose bugs and vulnerabilities may be addressed by code modifications provided by software patches. Given a device and its software versions, a system may determine which software patch code modifications apply to a software version, and when a software patch applies to software on a device, the system may send the patch with instructions to apply the patch to the software, or may apply the patch and send the patched software to the device for installation and execution.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example system 100 for using neural networks to determine software patch applicability, in accordance with one or more example embodiments of the present disclosure.

Referring to FIG. 1, the system 100 may include software code that has been patched with a first patch (e.g., Patch 1 as shown). For example, the software code may be a codebase which may have had a bug or vulnerability that was "patched" by applying software code modifications provided by the first patch. The modifications may include the introduction or removal of variables, the introduction or removal of executable instructions, and the like. The system 100 may analyze other software patches (e.g., Patch 2) to determine whether the other patches are applicable to a codebase such as the software code. In particular, the system 100 may determine and compare feature vectors representing respective vectors whose values represent quantitative measurements that represent comparisons between the respective patches and a codebase.

Still referring to FIG. 1, the differences between Patch 1 and the codebase may be represented by feature vector 102, and the differences between Patch 2 and the codebase may be represented by feature vector 104. Each feature vector may be represented graphically as shown, with individual feature values indicating the accuracy of a patch (e.g., the applicability of the patch to a codebase). For example, feature 1, feature 2, feature 3, . . . , feature N may include quantitative measurements such as Levenshtein-Damereau distance, Needleman-Wunsch alignment, a number of unused variables, a number of added lines or characters of code, a number of removed lines or characters of code, a number of common N-Grams, and the like as provided by the respective patch. In one example, when feature 1 represents a number lines of code added by a patch to a codebase, the feature vector 102 shows that Patch 1 adds more lines of code to the software code than Patch 2. To determine whether Patch 2 applies to the software code, the system 100 may determine whether the feature vector 104 is the same as or similar to the feature vector 102 because the feature vector 102 provides quantitative measurements of Patch 1, which is known to be applicable to the software code. In one example, the system 100 may determine whether any number of respective feature vector values of the feature vector 104 are the same as or satisfy a corresponding threshold 105 as the corresponding feature vector values of the feature vector 102 (e.g., the number of added lines of code of the feature vector 104 and the number of added lines of code of the feature vector 102 are both less than a threshold value, which may be the number of lines of code added by Patch 1, or some other number determined to be indicative of a patch which may be applicable to the software code).

Still referring to FIG. 1, a remote computing system 106 (e.g., one or more servers or other computing devices—real or virtual—of a cloud-based computing system) may perform the analysis of whether a software patch is applicable to a codebase. At block 108, the remote computing system 106 may determine Patch 1 by identifying patches that have been applied to the software code, or by analyzing the feature vector 102 to determine whether any number of respective feature values of the feature vector 102 satisfy the threshold 105 or any combination of thresholds (e.g., any feature vector value may be associated with its own respective threshold value determined based on historical analysis to be indicative of a patch being applicable to a codebase).

At block 110, the remote computing system 106 may determine the Patch 2, whose applicability to the software code may not be known. For example, Patch 2 may be stored with metadata indicating that it is written for the software code, but Patch 2 may apply to a previous version of the software code rather than the current version, and the remote computing system 106 may not have verification that Patch 2 applies to the current version of the software code. Alternatively, the software modifications of Patch 2 may have been copied from a file to another file which does not indicate whether Patch 2 applies to a particular version of the software code.

At block 112, the remote computing system 106 may determine that the software code 112 has been modified by Patch 1. In particular, Patch 1 may provide changes to the software code, and the software code may include those changes. Alternatively, the remote computing system 106 may determine that the feature vector 102 is indicative of a software patch applicable to the software code whether or not the software code has already been modified according to the modifications provided by Patch 1.

At block 114, the remote computing system 106 may determine that the features of Patch 2 are similar to the features of Patch 1 and to the feature of other patches which have been identified as applicable to the software code. In particular, the remote computing system 106 may set patch applicability criteria for the software code based on the features of Patch 1 and the features of other patches whose modifications apply to the software code. When Patch 1 is the only patch known to be applicable to the software code or when Patch 1 is representative of the applicable software patches to the software code, the remote computing system 106 may compare one or more vector feature values of the feature vector 104 to the corresponding one or more vector feature values of the feature vector 102. When any number of the corresponding feature vector values are the same or satisfy the applicability criteria (e.g., satisfy the threshold 105), the feature vector 104 may be indicative of an applicable patch (e.g., Patch 2 applies to the software code). For example, when any or all feature of the feature vector 104 are less than or equal to the threshold 105 (or otherwise satisfy any number of thresholds by being above or below based on whether a high or low value is indicative of patch applicability), the feature vector 104 may indicate that Patch 2 applies to the software code. In one particular example, because the remote computing system 106 may have verification that Patch 1 is applicable to the software code, the remote computing system 106 may determine whether any number of feature vector values of the feature vector 104 are the same or less than a respective corresponding value of the feature vector 102.

At block 116, the remote computing system 106 may apply the modifications of Patch 2 to the software code. For example, when Patch 2 includes added or removed code to a particular portion of the software code (e.g., a hunk of code in the software code), the remote computing system 106 may modify the software code by adding and removing code according to the code included in Patch 2.

In one or more embodiments, the remote computing system 106 may use machine learning techniques, such as neural networks, to determine the applicability of software patches to any codebase, and to identify characteristics (e.g., feature vector values and thresholds) which indicate that a patch may be applicable or not applicable to a codebase. For example, the remote computing system 106 may determine, based on initial training data and learned data from historical analysis of software patches, that patches having a Levenshtein-Damereau distance within a threshold value are indicative of patch applicability. The machine learning algorithms used by the remote computing system 106 may include a convolutional neural network or other neural networks. Convolutional neural networks may refer to a class of deep, feed-forward artificial neural networks, and may use a variation of multilayer perceptrons designed to require minimal preprocessing.

Figure 2:
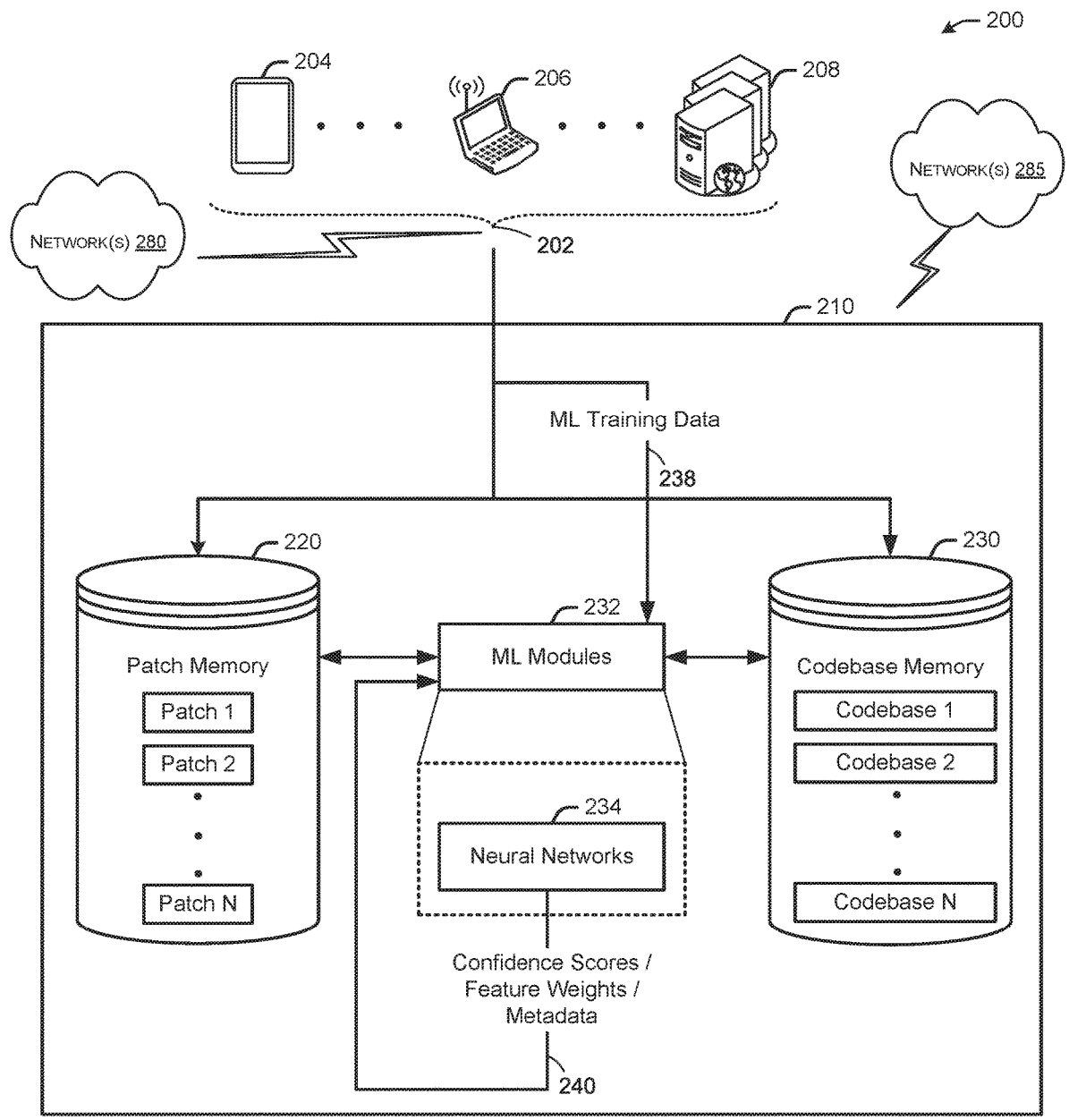
FIG. 2 illustrates an example system for using neural networks to determine software patch applicability, in accordance with one or more example embodiments of the present disclosure.

FIG. 2 illustrates an example system 200 for using neural networks to determine software patch applicability, in accordance with one or more example embodiments of the present disclosure.

Referring to FIG. 2, the system 200 may include one or more devices 202, which may include user device 204, user device 206, and one or more servers 208. The one or more devices 202 may access a remote computing system 210 (e.g., a cloud computing system), which may host remote computing resources and services. The remote computing system 210 may include multiple services, resources, and components, such as a software patch memory 220 (e.g., one or more databases or other storage), a codebase memory (e.g., one or more databases or other storage), and one or more machine learning modules 232, which may use one or more neural networks 234 and/or other machine learning techniques as described further below. The one or more devices 202 and the remote computing system 210 may communicate with one another using one or more communications networks 280 and one or more communications networks 285.

In one or more embodiments, the remote computing system 210 may receive software patches (e.g., Patch 1, Patch 2, . . . , Patch N as shown) from the one or more devices 202, and may store the software patches in the patch memory 220. The remote computing system 210 may receive codebases (e.g., codebase 1, codebase codebase N as shown) from the one or more devices 202, and may store the codebases in the codebase memory 230. The one or more machine learning (ML) modules 232 may be trained to analyze the applicability of software patches to any of the codebases. For example, the patches may include software code modifications to the software code in any of the codebases. The software code modifications may be stored with metadata indicating codebases to which the patches are to apply. Developers may change the filenames and file paths of the files with the software patch code, so when metadata for a patch indicates a filename or file path, the remote computing system 210 may fetch the corresponding file with the patch for analysis of applicability. When a filename or file path has moved, however, the remote computing system 210 may identify hunks of code in a patch file, and may find a corresponding file with the hunks of code. The file with the code for a patch may be analyzed by the remote computing system 210 to determine whether the patch applies to a codebase.

In one or more embodiments, the one or more machine learning modules 232 may perform patch applicability analysis (e.g., using block 108-block 116 as shown in FIG. 1). The one or more machine learning modules 232 may determine feature vectors (e.g., the feature vector 102, the feature vector 104 of FIG. 1) of a software patch. The one or more machine learning modules 232 may identify a patch which has been determined to be applicable to a codebase (e.g., either has been applied to the codebase or may be applied to the codebase), and may set feature value thresholds based on one or more applicable patches for a given codebase. In this manner, the one or more machine learning modules 232 may determine applicable threshold values for respective feature vectors of patches which apply and which do not apply to a codebase. The one or more machine learning modules 232 may use feature vector values of an applicable software patch to determine whether the feature vector values of another patch also are applicable to the codebase. For example, the one or more machine learning modules 232 may compare the feature vector values of a first patch to the feature vector values of a second patch known to be applicable to a codebase, and when one or more of the feature vector values of the first patch are within a threshold difference of corresponding feature vector values of the second patch or satisfy one or more thresholds determined based on feature vector values of the second patch and/or any other applicable patch, the one or more machine learning modules 232 may determine that the first patch satisfies applicable patch criteria and therefore also is applicable to the codebase. The one or more machine learning modules 232 may update thresholds and other criteria for patch applicability determinations based on the feature vector values of any given patch.

In one or more embodiments, the one or more neural networks 234 may analyze patches in the patch memory 220 for applicability to software in the codebase memory 230. The one or more machine learning modules 232 may receive training data 238 (e.g., from the one or more devices 202 or from human operators). The training data 238 may set initial thresholds for feature values, values for feature weights, and threshold confidence scores used to determine whether a software patch is applicable to a codebase. The one or more neural networks 234 may adjust the criteria, including thresholds and feature weights, based on determinations of whether patches with features of certain values are identified as applicable or not to a codebase. The one or more neural networks 234 may determine, as outputs of the software patch applicability analysis, confidence scores (e.g., indicative of the likelihood that a patch is applicable to a codebase), feature weights (e.g., a Levenshtein-Damereau distance may receive a higher weight used to determine software patch applicability confidence score than another feature), and metadata (e.g., providing information regarding respective patches, their applicability to a codebase, filenames, file paths, and the like). The outputs may be stored by the remote computing system 210 and may be used in continued machine learning by the one or more machine learning modules 232 to adjust software patch applicability criteria.

In one or more embodiments, the one or more devices 202 may include any suitable processor-driven device including, but not limited to, a mobile device or a non-mobile (e.g., a static) device. For example, the one or more devices 202 may include, a user equipment (UE), a station (STA), an access point (AP), a software enabled AP (SoftAP), a personal computer (PC), a virtual computer, a wearable wireless device, a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

Any of the communications networks 280 and/or 285 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 280 and/or 285 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 280 and/or 285 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

In one or more embodiments, machine learning may be based on manual decisions regarding the applicability of software patches. JIRAs, Gerrits, and other files or project management tools may provide indications of whether a manual review of a patch resulted in a determination of patch applicability or not. Criteria such as thresholds may be adjusted based on any patch's feature vector values (e.g., respective thresholds may be increased or decreased based on an applicable patch's feature vector values). Using JavaScript Object Notations (JSONs), machine learning may identify and extract features used to determine the feature vectors. For example, a JSON or other object or file may indicate the number of lines of code added or subtracted, Levenshtein-Damereau distance, Needleman-Wunsch alignment, and the like.

Figure 3A:
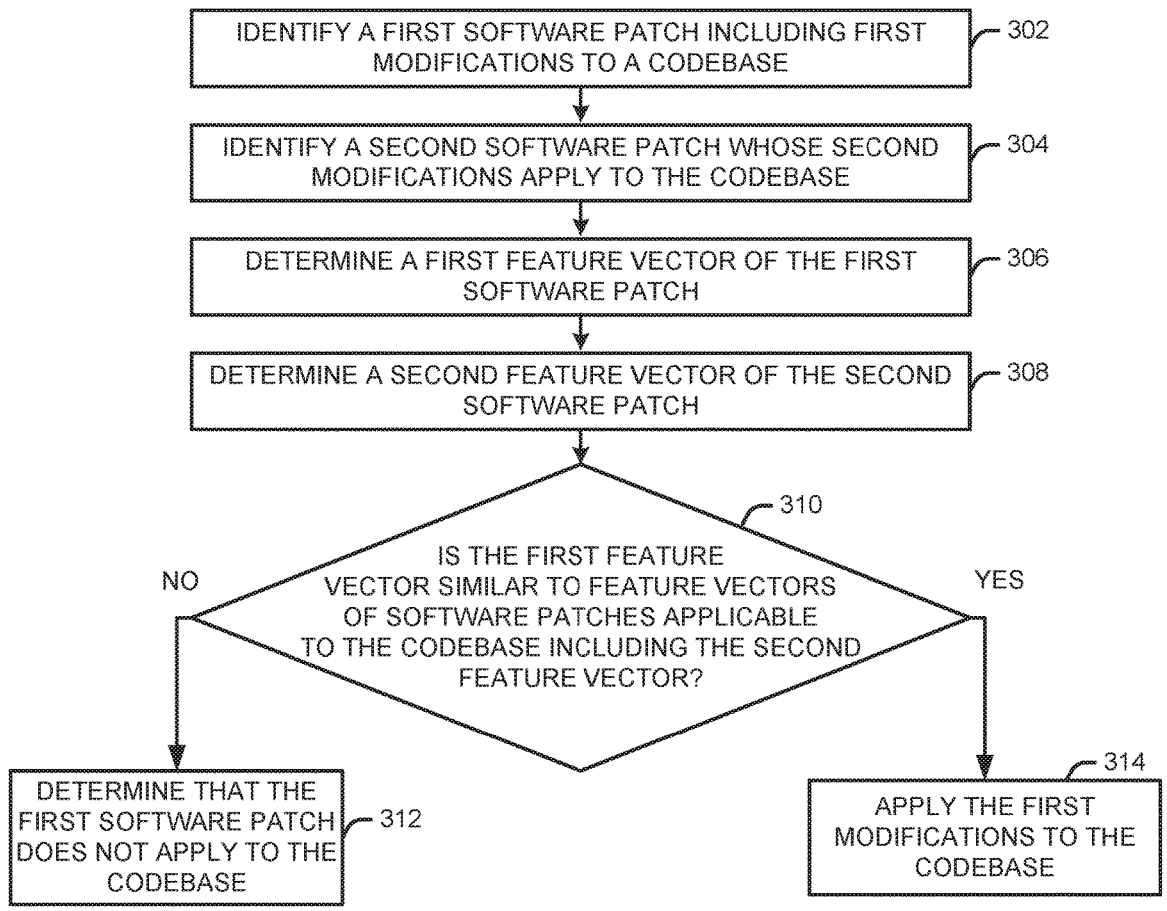
FIG. 3A illustrates an example process for using neural networks to determine software patch applicability, in accordance with one or more example embodiments of the present disclosure.

FIG. 3A illustrates an example process 300 for using neural networks to determine software patch applicability, in accordance with one or more example embodiments of the present disclosure.

At block 302, a system (e.g., the remote computing system 106 of FIG. 1, the remote computing system 210 of FIG. 2) may identify a first software patch (e.g., Patch 2 of FIG. 1) including first modifications to a codebase (e.g., the software code of FIG. 1). The first software patch may be received from a repository or device (e.g., the one or more devices 202 of FIG. 2), and may be stored (e.g., in the patch memory 220 of FIG. 2) for analysis and application to address bugs and vulnerabilities of the codebase. For example, the software patch may include software code which, when applied to the codebase, may modify the codebase by changing characters and/or lines of code in the codebase, adding lines of code to the codebase, removing lines of code from the codebase, and the like. The software patch may include code in a file, document, tool, or program, and may include metadata indicating the codebase for which the patch is intended.

At block 304, the system may identify a second software patch (e.g., Patch 1 of FIG. 1) including second modifications to the codebase for which the first software patch is intended. The system may have verification that the second software patch applies to the codebase, either because the codebase has been modified according to the second modifications in the second software patch, or because the system has evaluated the feature vector (e.g., the feature vector 102 of FIG. 1) of the second software patch and verified that the feature vector satisfies criteria that the system has learned (e.g., from training data and historical feedback from analysis of other software patches) to be indicative of a software patch which applies to the codebase.

At block 306, the system may determine a feature vector of the first software patch (e.g., the feature vector 104 of FIG. 1). The system may analyze the code in the first software patch and compare the code to the codebase. The system may determine feature values for the feature vector based on quantitative measurements such as number of lines of code added or subtracted, number of variables unused by the patch and that are in the codebase or unused by the codebase and that are in the patch, the number of common N-Grams in the patch, the Levenshtein-Damereau distance, the Needleman-Wunsch alignment value, and other features.

At block 308, the system may determine a feature vector of the second software patch (e.g., the feature vector 102 of FIG. 1). The system may analyze the code in the second software patch and compare the code to the codebase. The system may determine feature values for the feature vector based on quantitative measurements such as number of lines of code added or subtracted, number of variables unused by the patch and that are in the codebase or unused by the codebase and that are in the patch, the number of common N-Grams in the patch, the Levenshtein-Damereau distance, the Needleman-Wunsch alignment value, and other features.

At block 310, the system may determine whether the feature vector of the first software patch is the same as or similar to the feature vectors of software patches identified as applicable to the codebase, such as the second software patch, or whether the criteria for feature vector values, as set in part based on the feature vector values of the second software patch, are satisfied in whole or in part by the first software patch. The system may set thresholds and other software patch applicability criteria based on feature vectors of software patches identified as applicable to the codebase. To determine whether the feature vector of the first software patch is similar to other applicable software patches, the system may analyze whether any number of feature values of the feature vector of the first software patch satisfy one or more thresholds, which may dynamically adjust when one or more feature values satisfies or fails to satisfy a threshold. When the second software patch is the only identified applicable software patch to the codebase or is determined to be representative of the applicability criteria, the system may determine whether a sufficient number of the features of the feature vector of the first software patch are within a threshold value of the corresponding features of the feature vector of the second software patch (e.g., when the Levenshtein-Damereau distance of the second software patch is 3, the Levenshtein-Damereau distance of the second software patch may be 3 or less, or within another threshold value, such as 4 or 5). When an insufficient number of vector feature values of the first patch fail to satisfy the patch applicability criteria as based on the second patch, the system may proceed to block 312, where the system may determine that the first patch does not apply to the codebase. When any or all of the vector feature values of the first patch satisfy the criteria for patch applicability, the system may proceed to block 314.

At block 314, the system may apply the first modifications of the first software patch to the codebase. Applying the first modifications may include sending one or more messages with the modifications to a device to apply/initiate application of the modifications to a codebase by making the modifications to the codebase. Alternatively, the system may patch the codebase by applying the modifications and sending the modified version of the software to any device using the software (e.g., the one or more devices 202 of FIG. 2).

Figure 3B:
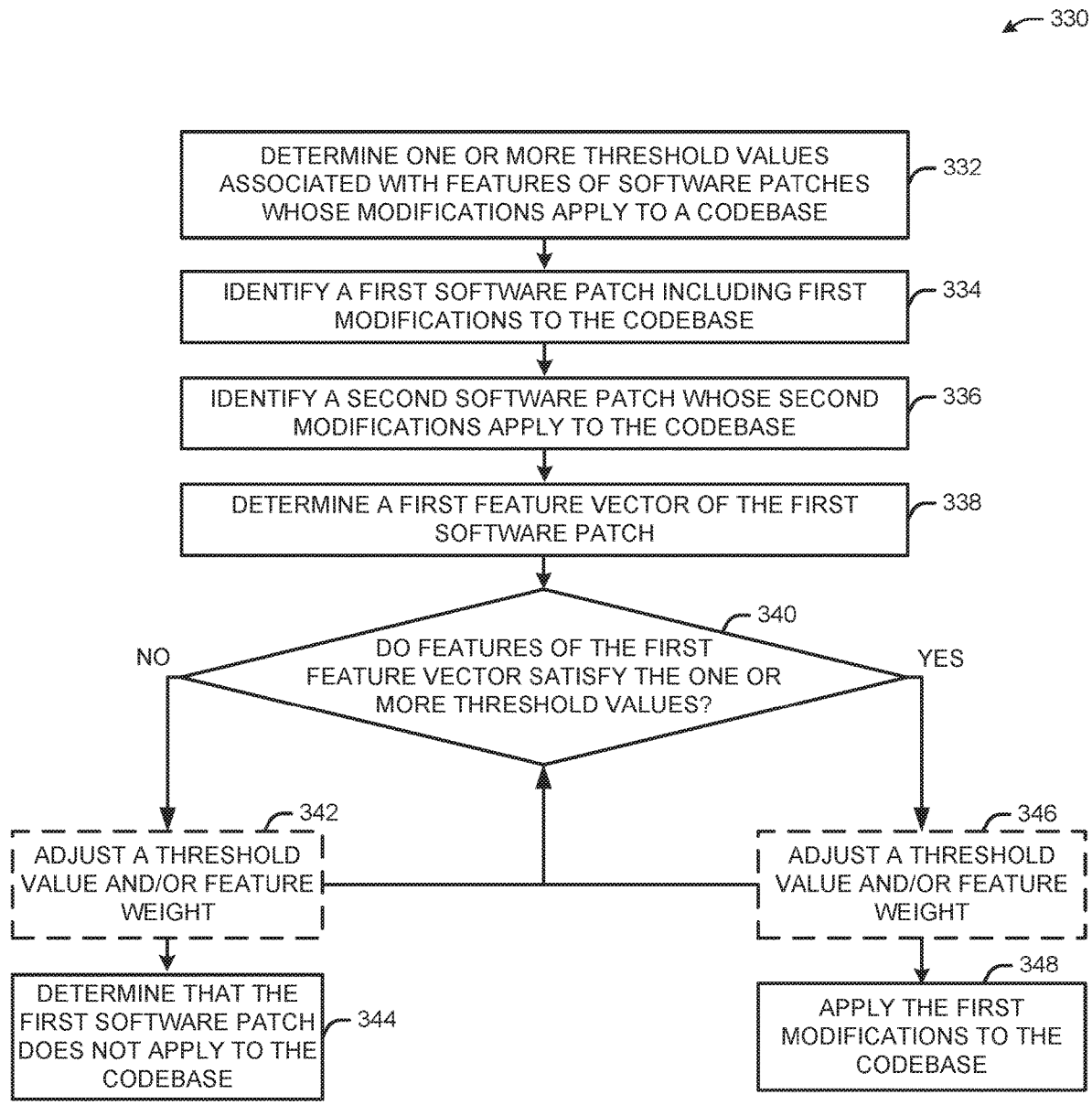
FIG. 3B illustrates an example process for using neural networks to determine software patch applicability, in accordance with one or more example embodiments of the present disclosure.

FIG. 3B illustrates an example process 330 for using neural networks to determine software patch applicability, in accordance with one or more example embodiments of the present disclosure.

At block 332, a system (e.g., the remote computing system 106 of FIG. 1, the remote computing system 210 of FIG. 2) may determine one or more threshold values associated with features of software patches whose modifications have been identified as applicable to a codebase. For example, respective feature values (e.g., a Levenshtein-Damereau distance) of feature vectors (e.g., for patches whose modifications are determined to apply to a codebase) may serve as threshold values for other patches being evaluated for patch applicability. When a smaller value of a feature is more likely to be indicative of applicability, a respective threshold value may be used to compare a corresponding feature value (e.g., the Levenshtein-Damereau distance) of a patch under evaluation, and the corresponding Levenshtein-Damereau distance may be indicative of applicability when the distance is less than or equal to the distance of the applicable patch. When a larger feature value indicates applicability, then a value exceeding a threshold may indicate applicability. The threshold may be based on feature vectors of other previously evaluated patches. For example, software patches may be evaluated for applicability, and threshold values indicating applicability may be modified based on the values of patches determined to be applicable to a given codebase. At block 334, the system may identify a first software patch (e.g., Patch 2 of FIG. 1) including first modifications to a codebase (e.g., the software code of FIG. 1). The first software patch may be received from a repository or device (e.g., the one or more devices 202 of FIG. 2), and may be stored (e.g., in the patch memory 220 of FIG. 2) for analysis and application to address bugs and vulnerabilities of the codebase. For example, the software patch may include software code which, when applied to the codebase, may modify the codebase by changing characters and/or lines of code in the codebase, adding lines of code to the codebase, removing lines of code from the codebase, and the like. The software patch may include code in a file, document, tool, or program, and may include metadata indicating the codebase for which the patch is intended.

At block 336, the system may identify a second software patch (e.g., Patch 1 of FIG. 1) including second modifications to the codebase for which the first software patch is intended. The system may have verification that the second software patch applies to the codebase, either because the codebase has been modified according to the second modifications in the second software patch, or because the system has evaluated the feature vector (e.g., the feature vector 102 of FIG. 1) of the second software patch and verified that the feature vector satisfies criteria that the system has learned (e.g., from training data and historical feedback from analysis of other software patches) to be indicative of a software patch which applies to the codebase.

At block 338, the system may determine a feature vector of the first software patch (e.g., the feature vector 104 of FIG. 1). The system may analyze the code in the first software patch and compare the code to the codebase. The system may determine feature values for the feature vector based on quantitative measurements such as number of lines of code added or subtracted, number of variables unused by the patch and that are in the codebase or unused by the codebase and that are in the patch, the number of common N-Grams in the patch, the Levenshtein-Damereau distance, the Needleman-Wunsch alignment value, and other features.

At block 340, the system may determine whether the feature of the first feature vector satisfy the one or more thresholds. The system may determine whether any or all features of the first feature vector satisfy one or more respective thresholds (e.g., whether the respective values of the first feature vector satisfy the one or more thresholds, or whether the difference of the respective values of the first feature vector from the feature values of the feature vector of the second software patch satisfy the one or more thresholds). The one or more thresholds may be based on the feature vector of the second software patch and any other software patches identified as being applicable to the codebase. When the second software patch is the only applicable software patch to the codebase or is representative of the larger dataset of applicable software patches to the codebase, the system may determine whether any or all feature values of the first feature vector are less than or equal to the corresponding feature values of the second feature vector. When any number of first feature vector values satisfy thresholds (e.g., a threshold number of feature vector values), the system may proceed to block 346. When an insufficient number of first feature vector values fail to satisfy a threshold, the system may proceed to block 344. The threshold may be the corresponding value of features for a patch known to be applicable to a codebase, or may be based on historical applicable patches (e.g., using machine learning).

At block 342, the system optionally may execute a dynamic adjustment to a threshold value or feature weight. When one or more feature values of the first feature vector fail to satisfy a respective threshold value, the system may adjust one or more thresholds of other values. For example, when a feature value of the first feature vector fails to satisfy a threshold value, other threshold values may be tightened (e.g., reduced) to reduce further allowance for deviation between the first software patch and the codebase. The system may change the weight of other features in subsequent analysis of other features of the first software patch.

At block 344, the system may determine that the first software patch does not apply to the codebase. The system may update criteria for applicability when a human operator review subsequently determines that the first software patch applies to the codebase. When the system determines that a software patch applies to the codebase, but a human operator subsequently determines that the patch is not applicable to the codebase, the system may update the criteria for applicability. In such a manner, the criteria for applicability may be updated when the system or a human operator determines that a software patch does not apply to a codebase.

At block 346, the system optionally may execute a dynamic adjustment to a threshold value or feature weight. When one or more feature values of the first feature vector satisfy a respective threshold value, the system may adjust one or more thresholds of other values. For example, when a feature value of the first feature vector satisfies a threshold value, other threshold values may be loosened (e.g., increased) to allow for deviation between the first software patch and the codebase. The system may change the weight of other features in subsequent analysis of other features of the first software patch.

At block 348, the system may apply/initiate application of the first modifications to the codebase. For example, the system may patch the software by making the first modifications to the codebase, or may send messages to any device with the codebase, the instructions providing indications to patch the codebase according to the first modifications.

Figure 3C:
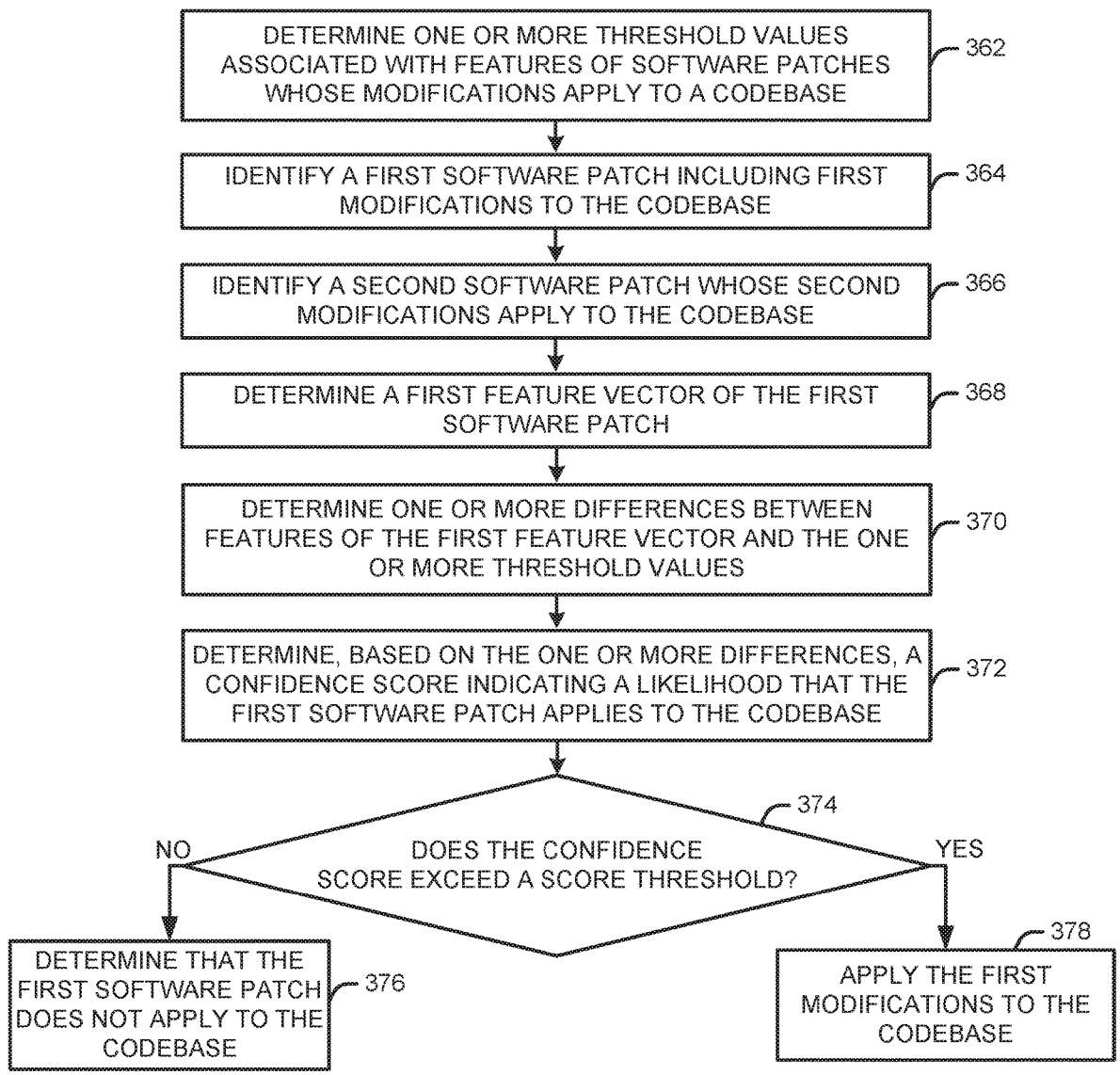
FIG. 3C illustrates an example process for using neural networks to determine software patch applicability, in accordance with one or more example embodiments of the present disclosure.

FIG. 3C illustrates an example process 360 for using neural networks to determine software patch applicability, in accordance with one or more example embodiments of the present disclosure.

At block 362, a system (e.g., the remote computing system 106 of FIG. 1, the remote computing system 210 of FIG. 2) may determine one or more threshold values associated with features of software patches whose features are identified as being applicable to a codebase. For example, respective feature values (e.g., a Needleman-Wunsch alignment) of the second feature vector (e.g., for a patch whose modifications are determined to apply to a codebase) may serve as threshold values for other patches being evaluated for patch applicability. When a smaller value of a feature is more likely to be indicative of applicability, a respective threshold value may be used to compare a corresponding feature value (e.g., the Needleman-Wunsch alignment) of a patch under evaluation, and the corresponding Needleman-Wunsch alignment may be indicative of applicability when the alignment is less than or equal to the alignment of the applicable patch. When a larger feature value indicates applicability, then a value exceeding a threshold may indicate applicability. The threshold may be based on feature vectors of other previously evaluated software patches. For example, software patches may be evaluated for applicability, and threshold values indicating applicability may be modified based on the values of software patches determined to be applicable to a given codebase.

At block 364, the system may identify a first software patch (e.g., Patch 2 of FIG. 1) including first modifications to a codebase (e.g., the software code of FIG. 1). The first software patch may be received from a repository or device (e.g., the one or more devices 202 of FIG. 2), and may be stored (e.g., in the patch memory 220 of FIG. 2) for analysis and application to address bugs and vulnerabilities of the codebase. For example, the software patch may include software code which, when applied to the codebase, may modify the codebase by changing characters and/or lines of code in the codebase, adding lines of code to the codebase, removing lines of code from the codebase, and the like. The software patch may include code in a file, document, tool, or program, and may include metadata indicating the codebase for which the patch is intended.

At block 366, the system may identify a second software patch (e.g., Patch 1 of FIG. 1) including second modifications to the codebase for which the first software patch is intended. The system may have verification that the second software patch applies to the codebase, either because the codebase has been modified according to the second modifications in the second software patch, or because the system has evaluated the feature vector (e.g., the feature vector 102 of FIG. 1) of the second software patch and verified that the feature vector satisfies criteria that the system has learned (e.g., from training data and historical feedback from analysis of other software patches) to be indicative of a software patch which applies to the codebase. The threshold values of block 362 may be based on the second software patch and any other applicable software patches to the codebase.

At block 368, the system may determine a feature vector of the first software patch (e.g., the feature vector 104 of FIG. 1). The system may analyze the code in the first software patch and compare the code to the codebase. The system may determine feature values for the feature vector based on quantitative measurements such as number of lines of code added or subtracted, number of variables unused by the patch and that are in the codebase or unused by the codebase and that are in the patch, the number of common N-Grams in the patch, the Levenshtein-Damereau distance, the Needleman-Wunsch alignment value, and other features.

At block 370, the system may determine one or more differences between features of the first feature vector and the one or more threshold values, which may be set based on machine learning from applicability analysis of the second software patch and any other software patch identified as applicable to the codebase. For example, a feature of the first feature vector may indicate that a number of unused variables is X, and a threshold value for a number of unused variables may be Y. The system may determine the difference between X and Y. The smaller the difference from values of patches known to be applicable to a codebase, the more likely that a patch under evaluation is to also be applicable to the codebase. The thresholds may be adjusted dynamically as described above with respect to block 342 and block 346 of FIG. 3B.

At block 372, the system may determine, based on the one or more differences from block 370, a confidence score indicting a likelihood that the first software patch is applicable to the codebase. A confidence score may be based on how many values are within a threshold of corresponding feature values of an applicable patch. The confidence score may represent a total difference between corresponding feature values, and the lower the difference, the higher the confidence score. The confidence score may be based on any combination of feature vector values, whether in total or in a subset of feature values.

At block 374, the system may determine whether the confidence score exceeds a score threshold. The score threshold may be set and/or learned (e.g., using machine learning based on previously analyzed patches). When the confidence score fails to exceed the score threshold, the system may continue to block 376, where the system may determine that the first software patch does not apply to the codebase. When the confidence score exceeds the score threshold, the system may continue to block 378, where the system may apply/initiate application of the first modifications to the codebase. For example, the system may patch the software by making the first modifications to the codebase, or may send messages to any device with the codebase, the instructions providing indications to patch the codebase according to the first modifications.

Referring to FIGS. 3A-3C, software patches previously determined to be applicable to a codebase (e.g., the second software patch of block 304 of FIG. 3A, the second software patch of block 336 of FIG. 3B, the second software patch of block 366 of FIG. 3C) may be software patches which apply to the same codebase as the codebase of the first software patch being evaluated, or may be software patches of different codebases. For example, when determining software patch applicability criteria (e.g., threshold values associated with feature vectors of software patches), a system may consider software patches that have been applied to the same code of the codebase for which the first software patch being evaluated is intended, software patches that have been applied to different code of the codebase for which the first software patch being evaluated is intended, and/or software patches which applied to different codebases. In this manner, a codebase for which a software patch being evaluated is intended need not have been modified previously. The criteria with which a software patch is evaluated to determine whether the software patch applies to any codebase may be based on software patches which applied to the same codebase or to another codebase. For example, the first software patch may be for first software code, and the second software patch may be for second software code that is the same software code as the first code or different software code than the first software code.

Figure 4:
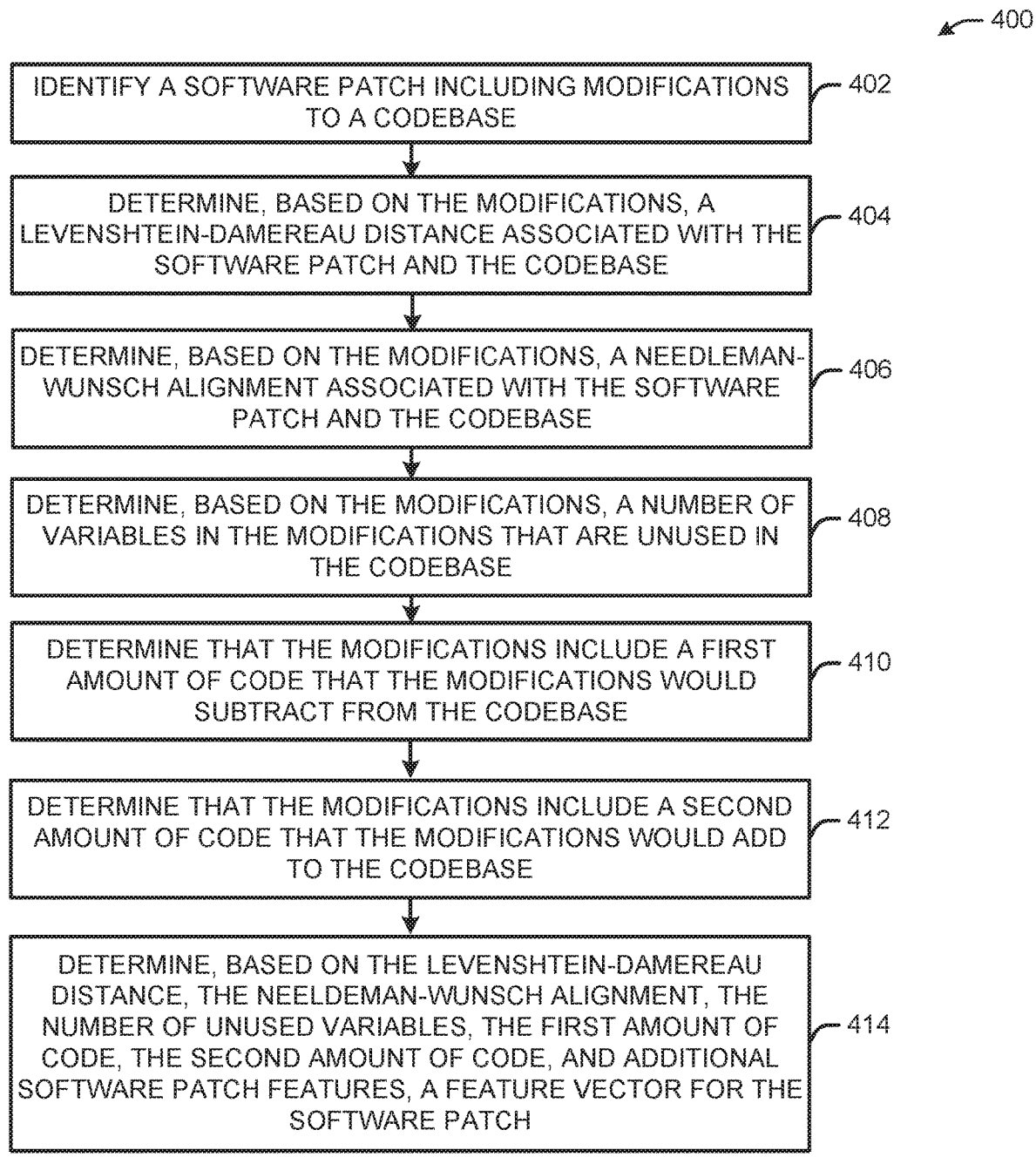
FIG. 4 illustrates an example process for using neural networks to determine software patch applicability, in accordance with one or more example embodiments of the present disclosure.

FIG. 4 illustrates an example process 400 for using neural networks to determine software patch applicability, in accordance with one or more example embodiments of the present disclosure.

At block 402, a system (e.g., the remote computing system 106 of FIG. 1, the remote computing system 210 of FIG. 2) may identify a first software patch (e.g., Patch 2 of FIG. 1) including modifications to a codebase (e.g., the software code of FIG. 1). The first software patch may be received from a repository or device (e.g., the one or more devices 202 of FIG. 2), and may be stored (e.g., in the patch memory 220 of FIG. 2) for analysis and application to address bugs and vulnerabilities of the codebase. For example, the software patch may include software code which, when applied to the codebase, may modify the codebase by changing characters and/or lines of code in the codebase, adding lines of code to the codebase, removing lines of code from the codebase, and the like. The software patch may include code in a file, document, tool, or program, and may include metadata indicating the codebase for which the patch is intended.

At block 404, the system may determine, based on the modifications, a Levenshtein-Damereau distance. The Levenshtein-Damereau distance may represent a number of character changes to perform on the codebase to match the relevant portion or hunk of code in the patch.

At block 406, the system may determine, based on the modifications, a Needleman-Wunsch alignment, which may represent the difference in sequences of code between the patch and any hunks of code to which a patch may apply.

At block 408, the system may determine, based on the modifications, a number of unused variables associated with the patch. For example, the patch may include a number of variables which are not used by the codebase (e.g., the patch may have been developed for a previous version of the codebase).

At block 410, the system may determine, based on the modifications, a first amount of code (e.g., lines or characters) that the patch would subtract from the codebase. For example, the patch may remove characters or lines of code from the codebase.

At block 412, the system may determine, based on the modifications, a first amount of code (e.g., lines or characters) that the patch would add to the codebase. For example, the patch may add characters or lines of code to the codebase.

At block 414, the system may determine, based on the features such as Levenshtein-Damereau distance, Needleman-Wunsch alignment, the number of unused variables, the number of added lines or characters, the number of subtracted lines or characters, and other features as discussed herein, a feature vector for the software patch (e.g., the feature vector 102, the feature vector 104 of FIG. 1). The system may use other feature values for the feature vector. The feature values may represent quantitative measurements of differences between the software patch and the codebase. For example, a diff code may indicate when the codebase uses variables that do not apply to a modified version of the code, when the software patch includes lines of code which are not included in the codebase, and other differences which can be quantitatively measured and represented by the feature vector. Diff code may compare versions of code and provide the differences used to quantify the feature vector values.

Figure 5:
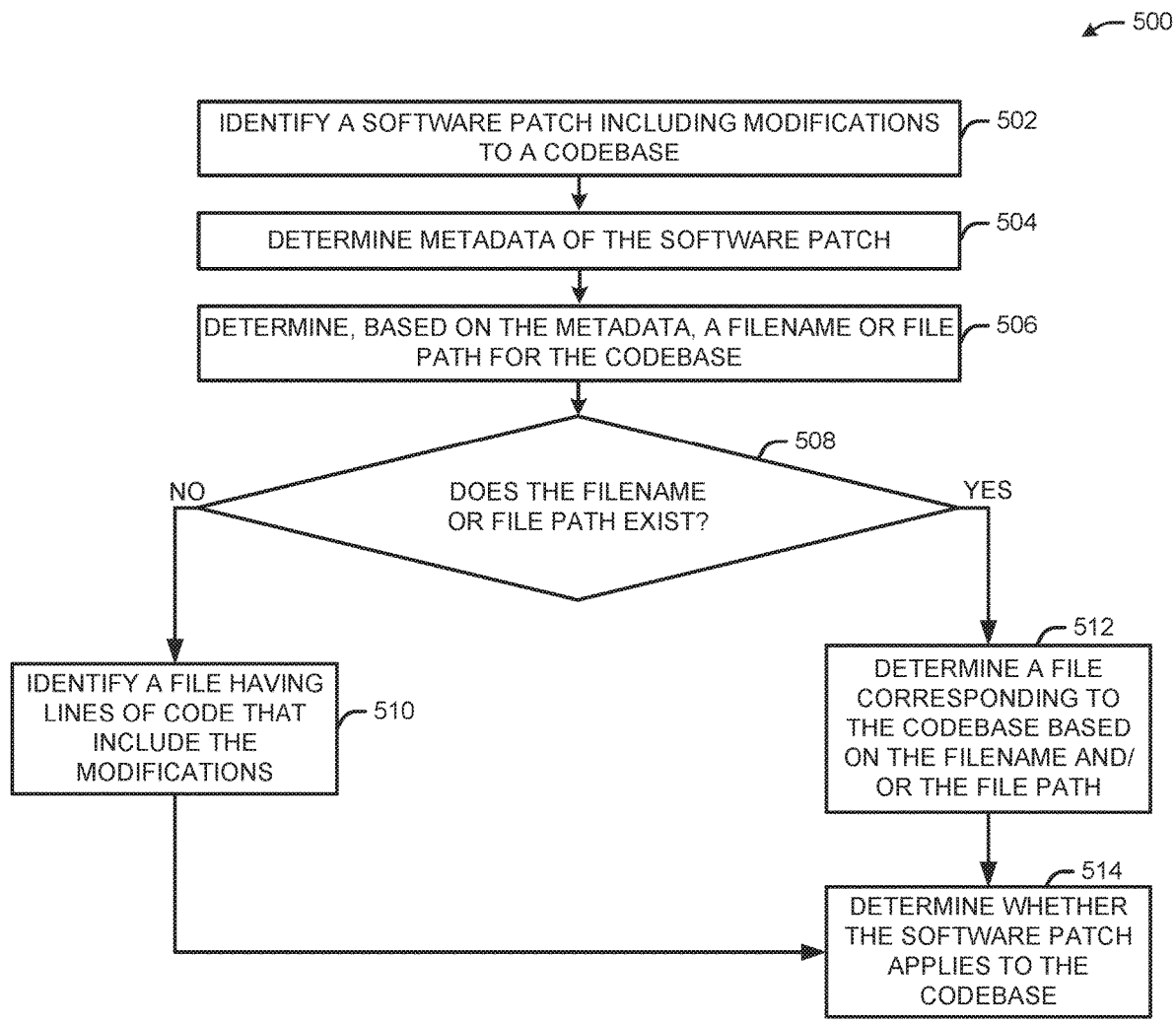
FIG. 5 illustrates an example process for using neural networks to determine software patch applicability, in accordance with one or more example embodiments of the present disclosure.

FIG. 5 illustrates an example process 500 for using neural networks to determine software patch applicability, in accordance with one or more example embodiments of the present disclosure.

At block 502, a system (e.g., the remote computing system 106 of FIG. 1, the remote computing system 210 of FIG. 2) may identify a software patch (e.g., Patch 2 of FIG. 1) including first modifications to a codebase (e.g., the software code of FIG. 1). The software patch may be received from a repository or device (e.g., the one or more devices 202 of FIG. 2), and may be stored (e.g., in the patch memory 220 of FIG. 2) for analysis and application to address bugs and vulnerabilities of the codebase. For example, the software patch may include software code which, when applied to the codebase, may modify the codebase by changing characters and/or lines of code in the codebase, adding lines of code to the codebase, removing lines of code from the codebase, and the like. The software patch may include code in a file, document, tool, or program, and may include metadata indicating the codebase for which the patch is intended.

At block 504, determine metadata of the software patch. The software patch may be stored with metadata indicating which codebase and version to which the patch is intended to apply, and a filename and/or file path of a file, object, or tool which includes the corresponding code which provides modifications to the codebase. At block 506, the system may determine, based on the metadata, a filename or file path of a file, object, or tool which includes the corresponding code which provides modifications to the codebase.

At block 508, the system may determine whether the filename or file path exists. When a file exists and is found based on the file name and/or file path, the system may proceed to block 512. When the filename and/or file path is invalid (e.g., the file does not exist or the file corresponding to the file path has a different name), the system may proceed to block 510.

At block 510, the system may search among files (e.g., patches) to identify hunks/lines of code corresponding to the modifications. When the system identifies such a file having a different filename and/or file path, the system may analyze the code in the corresponding file for applicability. At block 512, the system may determine and fetch the corresponding filename and file path, and at block 514 may determine whether the software patch whose code is in the file applies to a codebase. After identifying hunks/lines of code corresponding to the modifications at block 510, the system may proceed to block 514. The system may determine whether the identified code applies to the codebase.

Referring to FIGS. 3A, 3B, and 3C, different feature may be weighted higher than others based on machine learning and other evaluations of software patches for applicability to codebases. For example, a Levenshtein-Damereau distance may be more likely to impact the likelihood of a patch applying to a codebase than a number of added or subtracted lines of code. When determining whether a patch applies to a codebase, the threshold satisfaction of higher weighted features may result in a determination of applicability even when lower weighted features do not satisfy the same or another threshold. Any combination of features used to evaluate applicability may be selected based on the higher weights of the features. Machine learning may result in the adjustment of such feature weights based on which features show stronger impact on the applicability of a patch to a codebase.

The example embodiments described above are not meant to be limiting.

Figure 6:
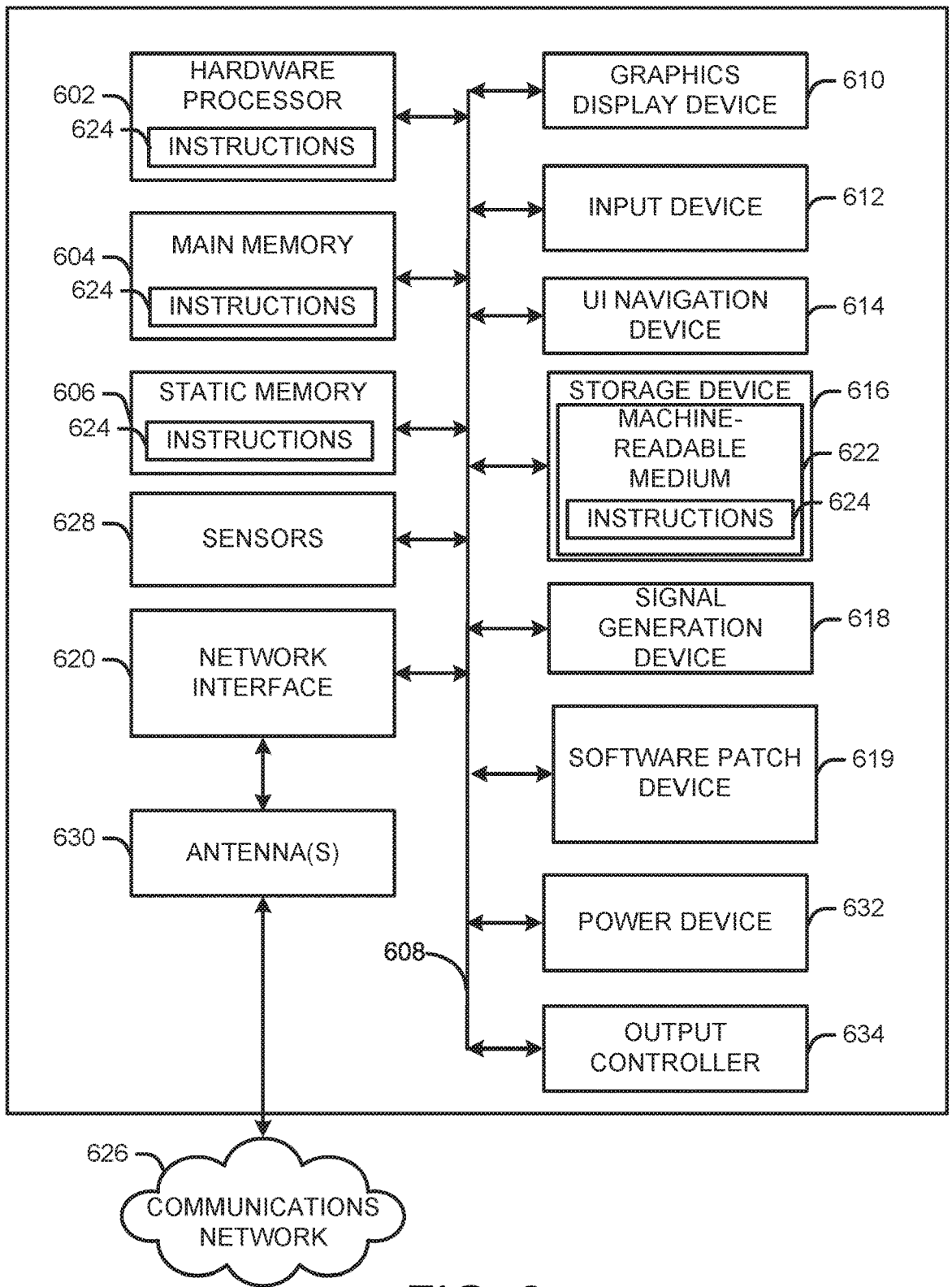
FIG. 6 illustrates a block diagram of an example machine upon which any of one or more techniques (e.g., methods) may be performed, in accordance with one or more example embodiments of the present disclosure.

FIG. 6 illustrates a block diagram of an example of a machine 600 (e.g., implemented in whole or in part by the remote computing system 106 of FIG. 1, the one or more devices 202 of FIG. 2, the remote computing system 210 of FIG. 2) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P) (or other distributed) network environments. The machine 600 may be a device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include any combination of the illustrated components. For example, the machine 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618, a software patch device 619, a network interface device/transceiver 620 coupled to antenna(s) 630, and one or more sensors 628. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The software patch device 619 may carry out or perform any of the operations and processes (e.g., process 300 of FIG. 3A, process 330 of FIG. 3B, process 360 of FIG. 3C, process 400 of FIG. 4, process 500 of FIG. 5) described and shown above.

In one or more embodiments, the software patch device 619 may be implemented as a user device or server (e.g., one or more devices 202 of FIG. 2) used to provide patches and codebases, along with metadata for the patches and codebases. T In one or more embodiments, the software patch device 619 may be implemented as a remote computer providing access to remote computer resources (e.g., the remote computing system 106 of FIG. 1, the remote computer system 210 of FIG. 2). The software patch device 619 may receive patches and codebases, may store the patches and codebases, may send software updates and patches to devices, and may evaluate patches for applicability to codebases.

In one or more embodiments, the software patch device 619 may assess whether software patches apply to a particular software application, library, kernel, bug, or vulnerability. Machine learning models may learn from previous decisions regarding the applicability of patches. Machine learning models may be set up and trained once, and the models may be adjusted based on results of patch applicability determinations. For example, bug tracking tools such as JIRAs and Gerrits may provide records of the patches, their code changes, the results of pushing then code changes of the patches, and other data related to results of applying a patch. Such gathering of data from patch records may refer to a data gathering phase.

In one or more embodiments, the software patch device 619 may execute a feature extraction phase. The software patch device 619 may quantify codebases, text files with code patches, and other documents and files by determining features such as how similar the text of modified codebase (e.g., modified by a patch) is to an original codebase (e.g., determining how many new lines of code were added or removed, determining how many new variables were introduced to or removed from the codebase, Levenshtein-Damereau distance (e.g., a number of character changes to perform on one piece of text for that text to match another piece of text) between the patch and the codebase, the Needleman-Wunch alignment, etc.). Based on the features, a patch may be compared to previously evaluated patches to determine whether a patch is applicable or not applicable.

In one or more embodiments, extracted features of code may be represented by a feature vector. A vector of values may represent respective values for different features related to a patch. For example, a feature vector may values for a number of lines of code added by a patch, a number of lines of code removed by a patch, a number variables added by a patch, and a number of variables removed by a patch. If the respective numbers of those variables are: 1, 2, 3, 4, then the feature vector may be represented by [1 2 3 4]. The software patch device 619 may determine whether a feature vector matches or is more similar to a set of values in a feature vector of a known applicable patch or to a feature vector of a known non-applicable patch.

In one or more embodiments, to determine whether a feature vector matches criteria for an applicable patch or for a non-applicable patch, the software patch device 619 may use vector space distance determinations between respective feature vectors. For example, a 20-dimensional feature vector of a patch may be compared to 20-dimensional feature vectors of known applicable and non-applicable patches based on previous assessments of patch applicability. When a feature vector has the same values as another patch identified as applicable to a codebase, then the feature vector may be representative of an applicable patch. When characteristics of applicable patches indicate that certain feature values are above or below threshold values, or within threshold ranges, then the same threshold values and ranges may be applied to evaluate other patches. When a patch's feature vector values meet the criteria of other applicable patches, the software patch device 619 may determine that a patch is applicable. When a patch's feature vector meets criteria associated with non-applicable patches or fails to meet criteria of applicable patches, the software patch device 619 may identify the patch as non-applicable to a codebase. For example, applicable patches may have a smaller Levenshtein-Damereau distance (e.g., below a threshold distance) than patches that do not apply to a codebase, or may have a number of added lines below a threshold while patches that do not apply have a number of added lines exceeding the threshold.

In one or more embodiments, to determine whether a patch is applicable or not, the software patch device 619 may use threshold confidence levels/scores. For example, a feature vector for a patch may be assigned a percentage applicable output based on the distance of the feature vector from a feature vector of an applicable or non-applicable patch. The closer to a feature vector of an applicable patch, the higher the percentage applicability a feature vector may be.

In one or more embodiments, the software patch device 619 may update their evaluation criteria based on whether previously evaluated patches were applicable or not applicable given their features, for example. When a patch was applicable, the machine learning models may update to reflect that the numerical values of features of the applicable patch were applicable, allowing for an analysis of whether another patch's features match the numerical features of other applicable patches. For example, feature values may be weighted, and thresholds may apply to respective feature values. Feature values that are more likely to affect whether a patch is applicable may be weighted higher than feature values whose variation does not affect patch applicability. The software patch device 619 may adjust thresholds and weights for respective features based on analysis of patches and whether patches having feature values of certain ranges renders the patch more or less likely to be applicable to a codebase.

It is understood that the above are only a subset of what the software patch device 619 may be configured to perform and that other functions included throughout this disclosure may also be performed by the software patch device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, wearable devices or sensors, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method, comprising:
    receiving a first software patch comprising first code modifications to a codebase;
    determining, using a neural network, that the codebase comprises second software code modifications included in a second software patch;
    determining, using the neural network, a first feature vector associated with the first software patch, wherein the first feature vector comprises a first value associated with the first software patch and a second value associated with the first software patch;
    determining, using the neural network, a second feature vector associated with the second software patch, wherein the second feature vector comprises a third value associated with the second software patch and a fourth value associated with the second software patch;
    determining, using the neural network, based on neural network training data and the second software code modifications, a first threshold value is associated with the third value;
    determining, using the neural network, based on the neural network training data and the second software code modifications, a second threshold value associated with the fourth value;
    determining that the first value satisfies the first threshold value;
    determining that the second value satisfies the second threshold value;
    determining, based on the first value and the second value, a confidence score indicating a likelihood that the first software patch applies to the codebase;
    determining that the confidence score satisfies a third threshold value; and
    sending an indication to apply the first code modifications to the codebase.

2. The method of claim 1, wherein the first value is a first Levenshtein-Damerau distance, wherein the second value is a first Needleman Wunsch alignment, wherein the third value is a second Levenshtein-Damerau distance, wherein the fourth value is a second Needleman Wunsch alignment, wherein determining that the first value satisfies the first threshold value comprises determining that the first Levenshtein-Damerau distance is less than or equal to the second Levenshtein-Damerau distance, and wherein determining that the second value satisfies the second threshold value comprises determining that the first Needleman Wunsch alignment is less than or equal to the second Needleman Wunsch alignment.

3. The method of claim 1, wherein the codebase is a first codebase, and wherein determining that the first codebase comprises the second software code modifications comprises:
    determining a second codebase;
    determining a third codebase, wherein the third codebase excludes the second software code modifications;
    determining a first Levenshtein-Damerau distance associated with the first codebase and the second codebase;
    determining a second Levenshtein-Damerau distance associated with the second codebase and the third codebase; and
    determining that the first Levenshtein-Damerau distance is less than the second Levenshtein-Damerau distance.

4. The method of claim 1, further comprising:
    identifying metadata associated with the first software patch;
    determining that the metadata comprises a filename;
    determining that the filename does not exist; and
    determining a file comprising the first code modifications, wherein the indication comprises instructions to perform the first code modifications to the file.

5. A method, comprising:
    receiving a first code modification associated with first software code;
    determining, using a neural network, that a second code modification previously was made to second software code, wherein determining that the second code modification previously was made to the second software code is associated with determining that the first code modification is to be applied to the first software code;
    determining, using the neural network, a first feature vector associated with the first code modification;
    determining, using the neural network, a second feature vector associated with the second code modification;
    determining, using the neural network, based on neural network training data and the determination that the second code modification previously was made to the second software code, a threshold value associated with the second feature vector;
    determining, using the neural network, that a first value associated with the first feature vector satisfies the threshold value;
    determining, using the neural network, based on the first value satisfying the threshold value, that the first code modification is to be applied to the first software code; and sending an indication to apply the first code modification to the first software code.

6. The method of claim 5, wherein determining the first feature vector comprises determining a Levenshtein-Damerau distance associated with a first feature of the first feature vector, and wherein determining that the first value of the first feature vector satisfies the threshold value comprises determining that the Levenshtein-Damerau distance is less than a threshold distance.

7. The method of claim 5, wherein determining the first feature vector comprises determining a Needleman-Wunsch alignment associated with a first feature of the first feature vector, and wherein determining that the first value associated with the first feature vector satisfies the threshold value comprises determining that the Needleman-Wunsch alignment is less than a threshold alignment value.

8. The method of claim 5, wherein determining the first feature vector comprises determining a number of unused variables associated with the first code modification, and wherein determining that the first value associated with the first feature vector satisfies the threshold value comprises determining that the number of unused variables is less than a threshold number of unused variables.

9. The method of claim 5, wherein determining the first feature vector comprises determining a number of n-grams associated with the first code modification, and wherein determining that the first value associated with the first feature vector satisfies the threshold value comprises determining that the number of n-grams is less than a threshold number of n-grams.

10. The method of claim 5, wherein the first feature vector comprises the first value and a second value, and wherein the threshold value is a first threshold value, further comprising:
determining, using the neural network, that the second value fails to satisfy a second threshold value,
wherein determining the first threshold value is further based on the second value failing to satisfy the second threshold value.

11. The method of claim 5, wherein determining the threshold value comprises:
determining, using the neural network, a third feature vector associated with a third code modification; and
determining that the third code modification was previously made to third software code, wherein determining the threshold value is further based on the third feature vector.

12. The method of claim 5, wherein the first feature vector comprises the first value and a second value, further comprising determining that the second value satisfies the threshold value.

13. The method of claim 5, wherein the first feature vector comprises the first value and a second value, wherein the second feature vector comprises a third value and a fourth value, wherein the threshold value is a first threshold value associated with the third value, further comprising determining a second threshold value associated with the fourth value, and wherein determining that the first value associated with the first feature vector satisfies the threshold value comprises:
determining that the first value satisfies the first threshold value; and
determining that the second value satisfies the second threshold value, wherein the first threshold value is different than the second threshold value.

14. The method of claim 5, further comprising:
receiving a third code modification associated with third software code;
determining a third feature vector associated with the third code modification;
determining that the third feature vector fails to satisfy the threshold value; and
determining that the third code modification does not apply to the third software code.

15. The method of claim 5, further comprising:
determining third software code;
determining fourth software code, wherein the fourth software code excludes the second code modification;
determining a first Levenshtein-Damerau distance associated with the second software code and the third software code;
determining a second Levenshtein-Damerau distance associated with the third software code and the fourth software code;
determining that the first Levenshtein-Damerau distance is less than the second Levenshtein-Damerau distance; and
determining that the second code modification was previously made to the second software code.

16. The method of claim 5, further comprising:
identifying metadata associated with the first code modification;
determining that the metadata comprises a filename;
determining that the filename does not exist; and
determining a file comprising the first code modification, wherein the indication comprises instructions to perform the first code modification to the file.

17. The method of claim 5, further comprising:
determining, based on the first feature vector, a confidence score indicating a likelihood that the first code modification applies to the first software code; and
determining that the confidence score satisfies a third threshold value, wherein sending the indication is based on the confidence score satisfying the third threshold value.

18. The method of claim 5, wherein the first feature vector comprises the first value and a second value, further comprising:
determining, using the neural network, a first weight associated with the first value;
determining, using the neural network, a second weight associated with the second value; and
determining, using the neural network, that the first weight is greater than the second weight, further comprising:
determining that the second value fails to satisfy the threshold value.

19. A system comprising memory coupled to at least one processor, the at least one processor configured to:
receive a first code modification associated with first software code;
determine, using a neural network, that a second code modification previously was made to second software code, wherein to determine that the second code modification previously was made to the second software code is associated with determining that the first code modification is to be applied to the first software code;
determine, using the neural network, a first feature vector associated with the first code modification;
determine, using the neural network, a second feature vector associated with the second code modification;
determine, using the neural network, based on neural network training data and the determination that the second code modification previously was made to the second software code, a threshold value associated with the second feature vector;

determine, using the neural network, that a first value associated with the first feature vector satisfies the threshold value;

determine, using the neural network, based on the first value satisfying the threshold value, that the first code modification is to be applied to the first software code; and send an indication to apply the first code modification to the software code.

20. The system of claim 19, wherein the first feature vector comprises the first value and a second value, wherein the threshold value is a first threshold value, and wherein the at least one processor is further configured to:

determine, using the neural network, that the second value fails to satisfy a second threshold value, wherein to determine the first threshold value is further based on the second value failing to satisfy the second threshold value.

\* \* \* \* \*